United States Patent
Akamatsu et al.

(10) Patent No.: US 7,819,587 B2
(45) Date of Patent: Oct. 26, 2010

(54) LUBRICATING DEVICE FOR ROLLING BEARING

(75) Inventors: Yoshinobu Akamatsu, Kuwana (JP); Masatsugu Mori, Kuwana (JP)

(73) Assignee: NTN Corporation, Osaka (JP)

( * ) Notice: Subject to any disclaimer, the term of this patent is extended or adjusted under 35 U.S.C. 154(b) by 776 days.

(21) Appl. No.: 11/665,694

(22) PCT Filed: Aug. 23, 2005

(86) PCT No.: PCT/JP2005/015257

§ 371 (c)(1), (2), (4) Date: Apr. 18, 2007

(87) PCT Pub. No.: WO2006/043365

PCT Pub. Date: Apr. 27, 2006

(65) Prior Publication Data

US 2009/0046965 A1    Feb. 19, 2009

(30) Foreign Application Priority Data

Oct. 19, 2004    (JP)    ............................ 2004-303779

(51) Int. Cl.
 F16C 33/66    (2006.01)
 F16C 37/00    (2006.01)
 F16C 19/02    (2006.01)
(52) U.S. Cl. ...................................... 384/474; 384/462
(58) Field of Classification Search ......... 384/473–474, 384/462, 465–466, 468, 551, 606; 184/6.26, 184/39.1, 55.1
See application file for complete search history.

(56) References Cited

U.S. PATENT DOCUMENTS

| | | | | |
|---|---|---|---|---|
| 4,759,427 A | * | 7/1988 | Onose et al. | ................. 384/466 |
| 6,176,349 B1 | * | 1/2001 | Kishi | ......................... 184/55.1 |
| 6,328,478 B1 | * | 12/2001 | Fukuda et al. | .............. 384/475 |

(Continued)

FOREIGN PATENT DOCUMENTS

JP    59-1929    1/1984

(Continued)

OTHER PUBLICATIONS

International Search Report for PCT/JP2005/015257 mailed Nov. 22, 2005 (2 pages).

(Continued)

*Primary Examiner*—Marcus Charles
(74) *Attorney, Agent, or Firm*—Osha Liang LLP

(57) ABSTRACT

A lubricating device for a rolling bearing includes a lubricating oil introduction member (7) that has a discharge opening (8) opened to a circumferential groove (6) provided in an end face of an inner race (2) of a bearing (1). A slope section (2b) is provided on an outer peripheral surface of the inner race (2) and guides the lubricating oil in the groove (6) to a raceway surface (2a) of the inner race (2) by centrifugal force and surface tension acting on the lubricating oil. The introduction member (7) is provided with a flange-like section (10) that overlays the slope section (2b) with a minute gap δ between the flange-like section (10) and the slope section (2b) and that controls the flow amount of the lubricating oil flowing through the gap δ to the raceway surface (2a).

16 Claims, 7 Drawing Sheets

U.S. PATENT DOCUMENTS

| | | | |
|---|---|---|---|
| 6,443,623 B2 * | 9/2002 | Sugita et al. | 384/466 |
| 6,682,222 B2 * | 1/2004 | Fisher | 384/462 |
| 2002/0102040 A1 * | 8/2002 | Koiwa et al. | 384/474 |

FOREIGN PATENT DOCUMENTS

| | | | |
|---|---|---|---|
| JP | 5-30559 | | 4/1993 |
| JP | 06137335 A | * | 5/1994 |
| JP | 6-264934 | | 9/1994 |
| JP | 7-24687 | | 1/1995 |
| JP | 7-145819 | | 6/1995 |
| JP | 10-58278 | | 3/1998 |
| JP | 10-299784 | | 11/1998 |
| JP | 11-141556 | | 5/1999 |
| JP | 2001-12481 | | 1/2001 |
| JP | 2002-54643 | | 2/2002 |

OTHER PUBLICATIONS

Patent Abstracts of Japan 2001-012481 dated Jan. 16, 2001 (1 page).
Patent Abstracts of Japan 10-299784 dated Nov. 10, 1998 (1 page).
Patent Abstracts of Japan 06-264934 dated Sep. 20, 1994 (2 pages).
Patent Abstracts of Japan 11-141556 dated May 25, 1999 (2 pages).
www4.jpdl.inpit.go.jp/cgi-bin/tran_web_cgi_ejje?u=http%3A%2F%2Fwww4.ipdl.inpit.go.jp% printed Apr. 5, 2007 abstract for JP05-030559, U (1 page).
Patent Abstracts of Japan 2002-054643 dated Feb. 20, 2002 (2 pages).
Patent Abstracts of Japan 10-058278 dated Mar. 3, 1998 (2 pages).
Patent Abstracts of Japan 07-024687 dated Jan. 27, 1995 (2 pages).
Patent Abstracts of Japan 07-145819 dated Jun. 6, 1995 (2 pages).
Notification of Transmittal of Translation of the International Preliminary Report on Patentability (Chapter I or Chapter II of the Patent Cooperation Treaty) for International Application No. PCT/JP2005/015257 mailed on May 3, 2007 (9 pages).

* cited by examiner

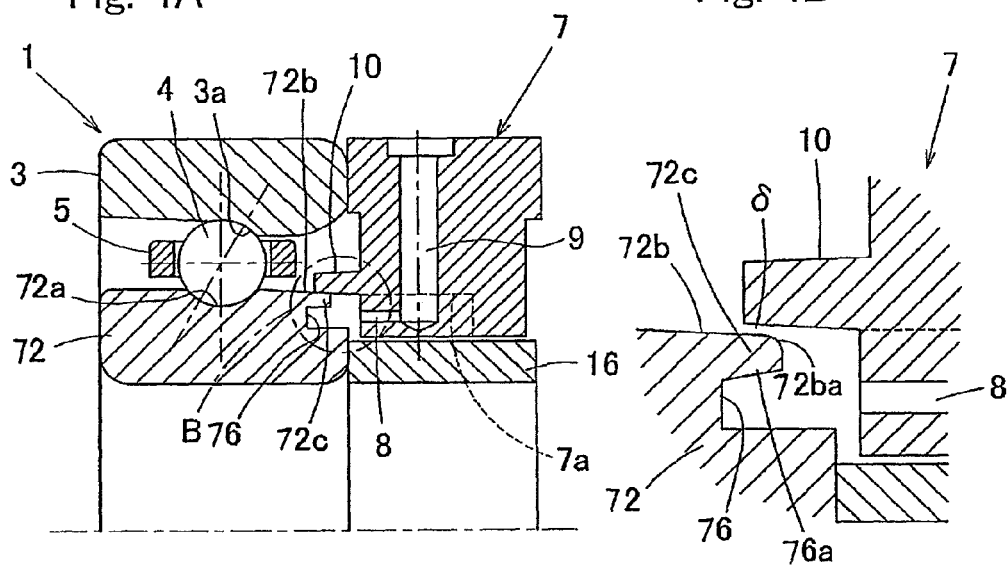
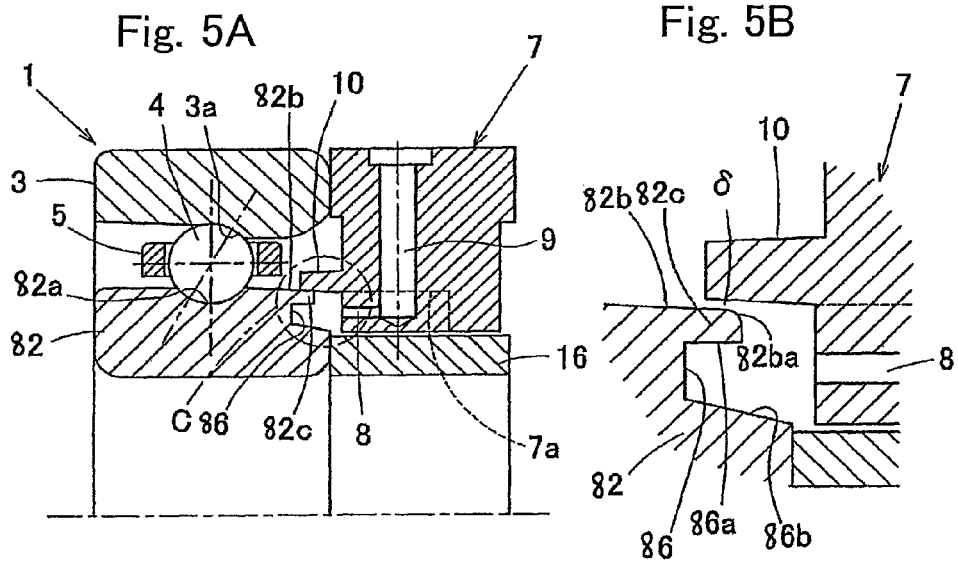

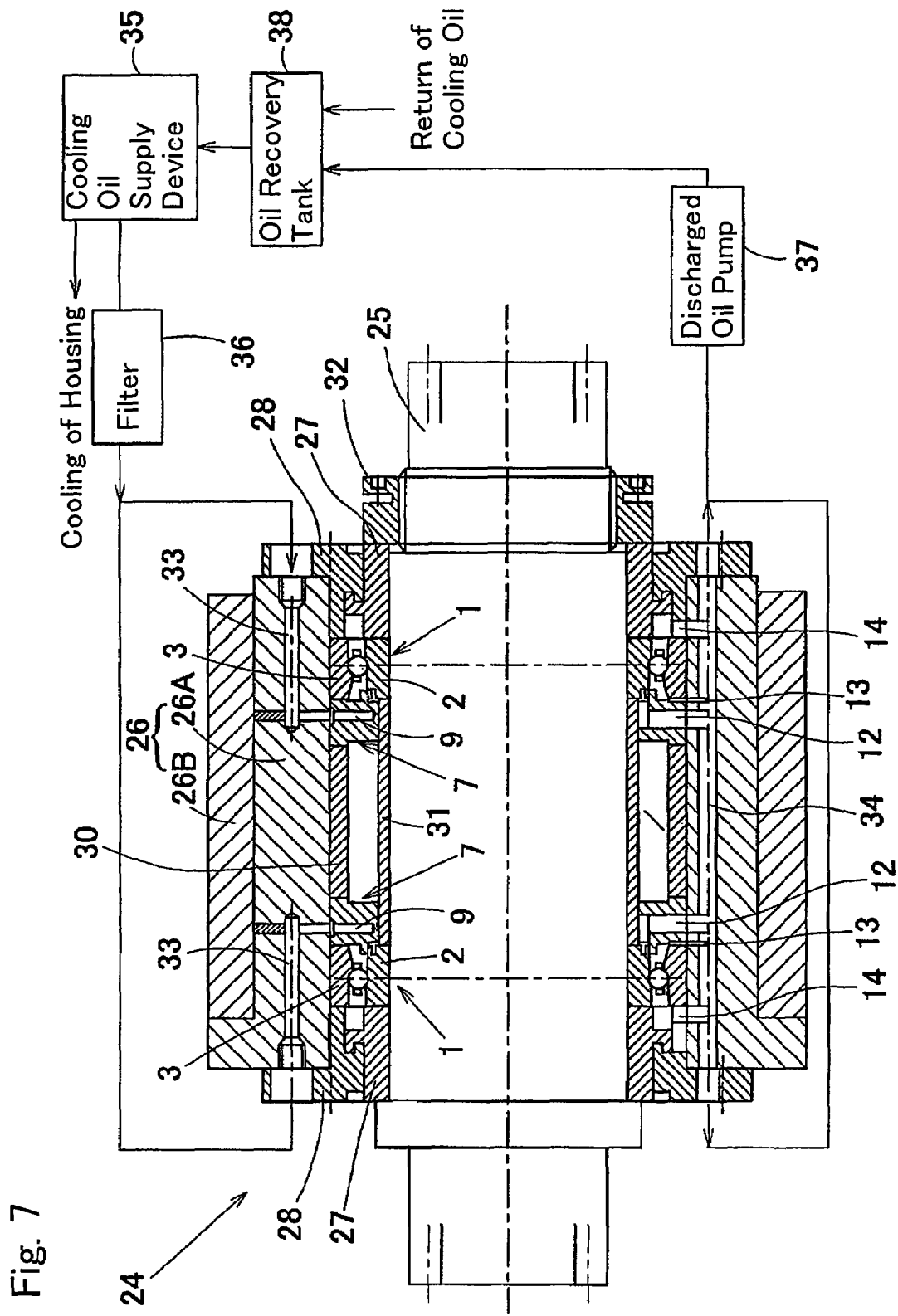

Prior Art

Prior Art

LUBRICATING DEVICE FOR ROLLING BEARING

FIELD OF THE INVENTION

The present invention relates to a lubricating device applicable in a rolling bearing or the like for a machine tool main spindle.

BACKGROUND ART

The machine tool main spindle is increasingly sped up in order to increase the machining efficiency. As a result of the speedups of the main spindle, the torque and the heat value increase in a main spindle bearing used for the main spindle. Accordingly, in order to deal with the increasing torque and the increasing heat value, a jet lubrication system or an air oil lubrication system is largely employed in lubricating the main spindle bearing.

According to the jet lubrication system, a substantial amount of oil is jetted into the bearing to accomplish both of lubrication of the bearing and cooling of the bearing simultaneously, but there is a problem in that since the stirring resistance of the lubricating oil increases (substantially proportional to the square of the speed) when the bearing is operated at high speed, the power loss of the bearing increases correspondingly, thus requiring the use of a high capacity drive motor.

Also, the air oil lubrication system is such that a transport air is mixed with a lubricating oil and the mixture of the air and the oil is jetted into the bearing through a nozzle. As a measure to reduce the stirring resistance of the oil within the bearing, it is suggested to deposit a small quantity of oil on an outer peripheral surface of an inner race of the bearing so that the oil can reach raceway surfaces of the bearing by the effect of a centrifugal force and a surface tension. (See the JP Laid-open Patent Publications No. 2001-012481 and No.

For example, in the lubricating structure disclosed in the JP Laid-open Patent Publication No. 2001-012481, which is reproduced in FIG. 8, a scoop area 50, which is an oil collecting area, is defined in one of opposite end faces of an inner race 42 of the bearing and, on the other hand, an oil supply nozzle 51 for jetting a lubricating oil towards the scoop area 50 is defined in an outer race spacer 47 that is disposed adjacent the scoop area 50. Also, the scoop area 50 is communicated with a raceway surface in the inner race 42 through a nozzle hole 52 formed in the inner race 42 so that most of the lubricating oil supplied from the oil supply nozzle 51 can enter the scoop area 50 and can then be sprayed to balls 44 through the nozzle hole 52 by the effect of a centrifugal force.

As shown in FIG. 9 showing, on an enlarged scale, a portion encompassed by the circle V in FIG. 8, a gap C of a gap size equal to or smaller than 0.2 mm is formed between one of opposite end faces of the outer race spacer 47 where the oil supply nozzle 51 is formed, and one of the opposite end faces of the inner race 42 where the scoop area 50 is formed. A portion of the lubricating oil, which is supplied from the oil supply nozzle 51, but deposits on the end face of the outer race spacer 47 without entering the scoop area 50, flows towards the end face of the inner race 42 by way of the gap C. Also, since an outer peripheral surface 50a of the inner race 42 adjacent the scoop area 50 is tapered to have a diameter increasing in a direction inwardly of the bearing and since a junction between the end face and the outer peripheral surface 50a of the inner race 42 is represented by a curved surface area 50c, the lubricating oil flowing from the oil supply nozzle 51 towards the end face of the inner race 42 is forced from the curved surface area 50c towards the outer peripheral surface 50a by the effect of a centrifugal force developed during rotation of the inner race 42 and is then supplied to an area under a retainer 45 for the balls 44.

It is to be noted that in the JP Laid-open Patent Publication No. 2001-012481 referred to above, the lubricating structure similar to that shown in described with reference to FIGS. 8 and 9, but with no nozzle hole 52 employed, is disclosed as shown in FIG. 10.

As for the air oil lubrication system, the air oil used therein has little cooling effect for the bearing. Accordingly, where the air oil lubrication system is employed, the use of a separate cooling mechanism is required. For this cooling mechanism, the cooling system is known, in which not only is a housing for the bearing cooled, but also a cooling oil is supplied towards a bore of a hollow shaft, supporting the bearing, to cool the bearing. (See, for example, the Japanese Patent No. 3084356 (the JP Laid-open Patent Publication No. H10-58278) and the JP Laid-open Patent Publications No. H07-24687 and No. H07-145819.)

DISCLOSURE OF THE INVENTION

The lubricating structure disclosed in the JP Laid-open Patent Publication No. 2001-012481 (and discussed with reference to FIGS. 8 to 10) has an additional problem in that if the size of the bearing is small and/or the thickness of the bearing inner race 42 is small, the gap C cannot be defined. Also, adjustment of the amount of oil to be supplied into the bearing must be carried out by means of an oil supply device for the oil supply nozzle 51. In addition, with the cooling mechanism disclosed in the Japanese Patent No. 3084356 and the JP Laid-open Patent Publications No. H07-24687 and No. H07-145819, there is a problem in that a special rotary coupling is required for supplying an oil towards the bore of the hollow shaft, which coupling is complicated in structure.

An object of the present invention is to provide a lubricating device for a rolling bearing, which device enables the bearing to be operated at high speed regardless of the size of the bearing and without increasing power loss of the bearing, and is capable of adjusting the amount of oil to be supplied with a simplified structure and cooling the bearing with no complicated oil supply mechanism employed.

The lubricating device for a rolling bearing according to the present invention includes a lubricating oil introduction member for discharging a lubricating oil into the rolling bearing to lubricate the rolling bearing. The rolling bearing includes an inner race having a raceway surface, and an outer race. The inner race has an end face formed with a circumferential groove and also has an outer peripheral surface that has a diameter increasing towards the raceway surface of the inner race to define a slope section. The lubricating oil introduction member has a discharge opening that opens towards the circumferential groove to discharge the lubricating oil into the circumferential groove. The slope section guides the lubricating oil within the circumferential groove towards the raceway surface of the inner race by an effect of a surface tension of the lubricating oil and a centrifugal force acting on the lubricating oil. A flange-like section is formed in the lubricating oil introduction member so as to overlay the slope section with a minute gap left between the flange-like section and the slope section for controlling a flow amount of the lubricating oil flowing towards the raceway surface.

According to this construction, the lubricating oil discharged from the discharge opening of the lubricating oil introduction member into the circumferential groove of the inner race can be supplied towards the raceway surface along the slope section of the inner race by the effect of the surface tension and the centrifugal force acting as a result of rotation of the inner race. The lubricating oil flowing along the slope section is controlled in a flow amount by the gap between the flange-like section, overlaying the slope section, and the slope section and the remaining portion of the lubricating oil is discharged to the outside. In other words, a portion of the lubricating oil, which would flow on the slope section if no flange-like section is employed, is prevented from flowing by the flange-like section because the gap has a small size and thus, the amount of flow through such gap can be controlled.

As hereinabove described, since the lubricating oil discharged from the lubricating oil introduction member is supplied into the bearing by flowing the oil along the surface of the inner race with the amount of flow of the oil being controlled, no high stirring resistance occurs in the bearing and the bearing can be operated at high speed without the power loss being increased. Unlike the lubricating structure in which a minute gap is formed at the end face of the inner race, the control of the flow amount of the lubricating oil can be accomplished even where the bearing size is small and/or the thickness of the inner race is small, since the flange-like section of the lubricating oil introduction member overlays the slope section on the outer peripheral surface of the inner race with the minute gap formed and the flow is controlled at this minute gap. The flow amount of the oil can be controlled with a simple structure of the flange-like section. Since the flow amount can be controlled with this minute gap, a proper amount of oil can be supplied to the bearing with no need to adjust the amount of the oil to be supplied to the lubricating oil introduction member. Because of this, the amount of the oil to be supplied can be determined with a simplified structure, in which the gap is defined by the flange-like section, without requiring a complicated control device for the flow amount of the oil. Since a portion of the lubricating oil supplied to the lubricating oil introduction member, but not used for the lubrication due to the flow control is discharged, the bearing can be cooled by a portion of the lubricating oil, not used for the lubrication and then discharged from the lubricating oil introduction member, if the amount of the lubricating oil to be supplied is chosen to be larger than that required for the lubrication. Because of this, the bearing can be cooled with no need to use any complicated cooling mechanism.

In the present invention, the lubricating oil introduction member may be provided with a lubricating oil discharge passage for discharging, except for a portion of the lubricating oil discharged from the discharge opening and flowing into the minute gap between the slope section of the inner race and the flange-like section, a remaining portion of the lubricating oil discharged from the discharge opening.

In particular, even without any special lubricating oil discharge passage being employed, the remaining lubricating oil excluding that flowing into the minute gap can be properly discharged to the outside through a gap between members or the like. However, the use of the lubricating oil discharge passage is effective to increase the efficiency of discharge of the lubricating oil and also to control the flow of the lubricating oil being discharged. Because of this, the cooling of the bearing with the lubricating oil being discharged can be accomplished effectively.

The lubricating oil introduction member may be in the form of a ring-shaped, outer race spacer disposed in contact with an end face of the outer race of the bearing. If the outer race spacer concurrently serves as the lubricating oil introduction member, there is no need to employ any special member as the lubricating oil introduction member and the structure of the lubricating device can therefore be simplified.

The lubricating oil introduction member may include, as the lubricating oil discharge passageway, an oil discharge passageway defined at a location spaced circumferentially from the discharge opening and extending from an inner peripheral surface to an outer peripheral surface of the lubricating oil introduction member.

If the discharge opening and the oil discharge passageway are spaced circumferentially from each other, the flow path through which the lubricating oil discharged from the discharge opening flows into the oil discharge passageway can be increased in length. For this reason, the contact surface area between the lubricating oil, used for cooling purpose, and the bearing or the lubricating oil introduction member can increase and the cooling efficiency can be increased correspondingly.

The lubricating oil introduction member may includes a groove-like oil discharge passageway that is defined in a surface thereof held in contact with the end face of the outer race so as to extend radially of the lubricating oil introduction member.

In the case of this construction, the lubricating oil once supplied into the bearing, which oil includes not only the lubricating oil used for lubrication, but also the lubricating oil not reaching the raceway surface, can be discharged from the groove-like oil discharge passageway. For this reason, the dischargeability of the lubricating oil supplied into the bearing can be enhanced and accumulation of the dirty lubricating oil within the bearing can be prevented.

In the present invention, a free end of a flange-like section, formed in the inner race between the circumferential groove and the slope section, may be set axially backwards from the end face of the inner race.

Where the bearing size is small, the provision of the circumferential groove in the end face of the inner race may result in excessive reduction in thickness of the flange-like section of the inner race that is formed between the circumferential groove and the slope section. Since the flange-like section has its outer peripheral surface formed as the slope section, setting the free end of the flange-like section axially backwardly from the end face of the inner race is effective to avoid the formation of the inner race having the excessive reduction in thickness of the flange-like section, allowing the strength of the inner race to be secured.

In the present invention, a radially outer wall surface of the circumferential groove in the inner race may be tapered to have a diameter increasing towards an opening of the groove. The formation of the tapered surface on the radially outer wall surface improves flow of the lubricating oil flowing from the radially outer wall surface of the circumferential groove towards the slope section by the effect of the centrifugal force.

In the present invention, a radially inner wall surface of the circumferential groove in the inner race may be tapered to have a diameter decreasing towards the opening of the groove. The formation of the tapered surface on the radially inner wall surface improves the collection of the lubricating oil, discharged from the discharge opening and then sprayed into the circumferential groove, at a bottom surface of the circumferential groove which is defined between the radially outer and inner wall surfaces and, therefore, the lubricating oil can be assuredly supplied from the circumferential groove towards the raceway surface of the inner race correspondingly.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 4A is a longitudinal sectional view of the lubricating device for the rolling bearing according to a third preferred embodiment of the present invention;

FIG. 4B is an enlarged view of a portion encompassed by the circle B in FIG. 1A;

FIG. 5A is a longitudinal sectional view of the lubricating device for the rolling bearing according to a fourth preferred embodiment of the present invention;

FIG. 5B is an enlarged view of a portion encompassed by the circle C in FIG. 5A;

FIG. 7 is a structural diagram showing a spindle device, equipped with the lubricating device for the rolling bearing according to the first embodiment of the present invention, and an oil supply device fluid connected with such spindle device;

BEST MODE FOR CARRYING OUT THE INVENTION

Figure 1A:
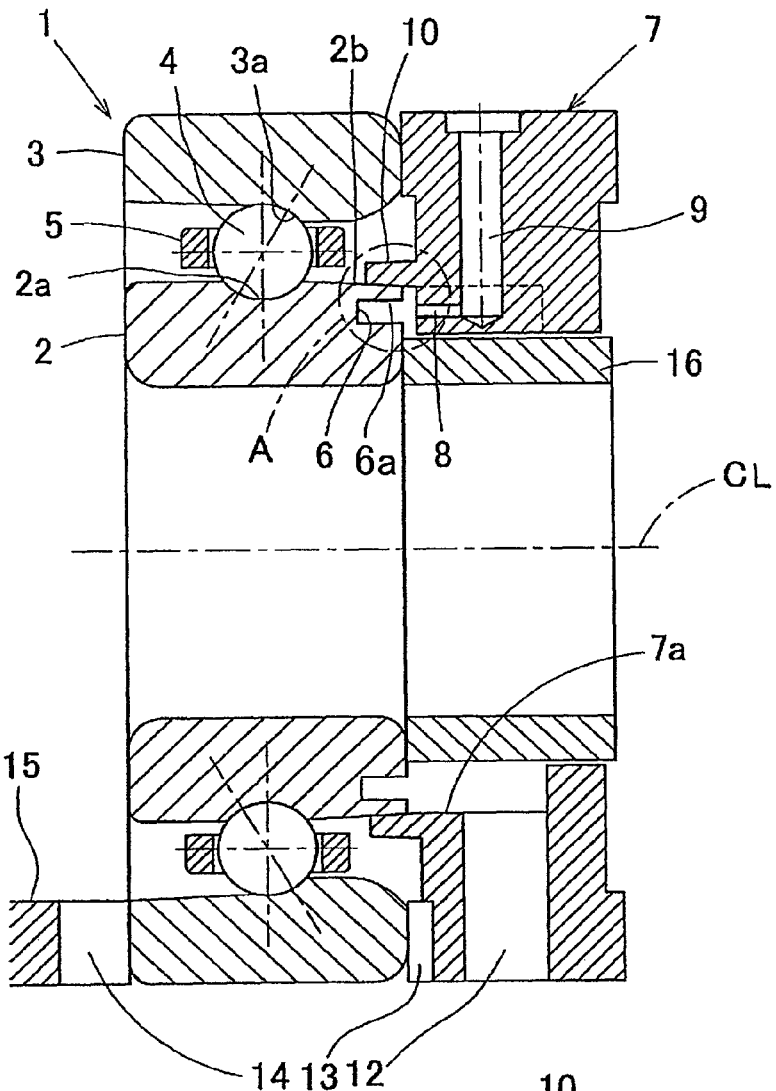
FIG. 1A is a longitudinal sectional view showing a lubricating device for a rolling bearing according to a first preferred embodiment of the present invention.

A first preferred embodiment of the present invention will be described with particular reference to FIGS. 1A, 1B and 2. FIG. 1A illustrates, in a sectional representation, a rolling bearing according to this first embodiment. A lubricating device in this rolling bearing is of a type, in which a portion of a cooling oil discharged from a lubricating oil introduction member 7 is supplied into the rolling bearing 1 as a lubricating oil. The rolling bearing 1 is in the form of an angular contact ball bearing and includes an inner race 2 having a raceway surface 2a, an outer race having a raceway surface 3a and a plurality of rolling elements 4 interposed between the raceway surfaces 2a and 3a. The rolling elements 4 are employed in the form of a ball and are retained by a retainer 5.

Material for the inner race 2 is chosen to be a carburized steel in consideration of a large mounting hoop stress developed during high speed operation. The retainer 5 is of, for example, an outer race guide type and material for the retainer 5 is preferably chosen to be bake, PEEK, C/C composite, aluminum alloy or Ti alloy (to increase the strength during the high speed operation). The rolling elements 4 are preferably made of a ceramic material in terms of reduction of the centrifugal force.

A circumferential groove 6 is formed in one (on a rear end of the bearing 1) of end faces of the inner race 2 of the rolling bearing 1, which end receives little load, so as to be depressed axially inwardly of the inner race 2. An outer peripheral surface of the inner race 2, which is continued to the raceway surface 2a on one side where the circumferential groove 6 is formed, is rendered to be an slope section 2b having a diameter increasing towards the raceway surface 2a and decreasing towards the end face where the circumferential groove 6 is formed. The minimum value of the angle $\alpha$ of inclination of the slope section 2b relative to a longitudinal axis CL (shown in FIG. 1(B)) of the rolling bearing 1 is so chosen as to satisfy the following formula:

$$\alpha \geq 0.0667 \times dn \times 10^{-4} - 1.8333$$

It is to be noted that dn represents the product of the inner diameter d (mm) of the bearing 1 multiplied by the rotational speed n (min$^{-1}$).

According to this formula, in the case where the rolling bearing 1 is an angular contact ball bearing having the inner diameter of 70 mm$\phi$ and a rotational speed of 30,000 min$^{-1}$, the angle $\alpha$ of inclination of the slope section 2b is chosen to be equal to or greater than 12.8°.

The maximum value of the inclination angle $\alpha$ is preferably equal to or smaller than 25° in the case of the angular contact ball bearing. In the case of the angular contact ball bearing, if the inclination angle $\alpha$ exceeds 25°, the radial width or the thickness of the end face of the inner race 2 where the slope section 2b is formed will become small and the contact surface area of the end face of the inner race 2 with the inner race spacer 16 decreases correspondingly, making it difficult for the rolling bearing 1 to support a large axially acting load. Where the rolling bearing 1 is an angular contact ball bearing, an outer peripheral surface of the inner race 2 on one of the sides of the bearing 1 where little load is imposed is rendered to be the slope section 2b.

The lubricating oil introduction member 7, when held in contact with an end face of the outer race 3, forms an outer race spacer of a ring-shaped configuration arranged adjoining axially the rolling bearing 1 and includes a discharge opening 8 opening towards the circumferential groove 6 in the inner race 2, and an oil supply passage 9 communicated with this discharge opening 8. A cooling oil, which is supplied from a bearing housing (not shown) to the oil supply passage 9 and is subsequently discharged from the discharge opening 8, is sprayed into the circumferential groove 6 in the inner race 2 and a portion of the oil flows as a lubricating oil from a radially outer wall surface 6a of the circumferential groove 6 towards the raceway surface 2a of the inner race 2 along the slope section 2b by the effect of a centrifugal force and a surface tension.

Figure 2:
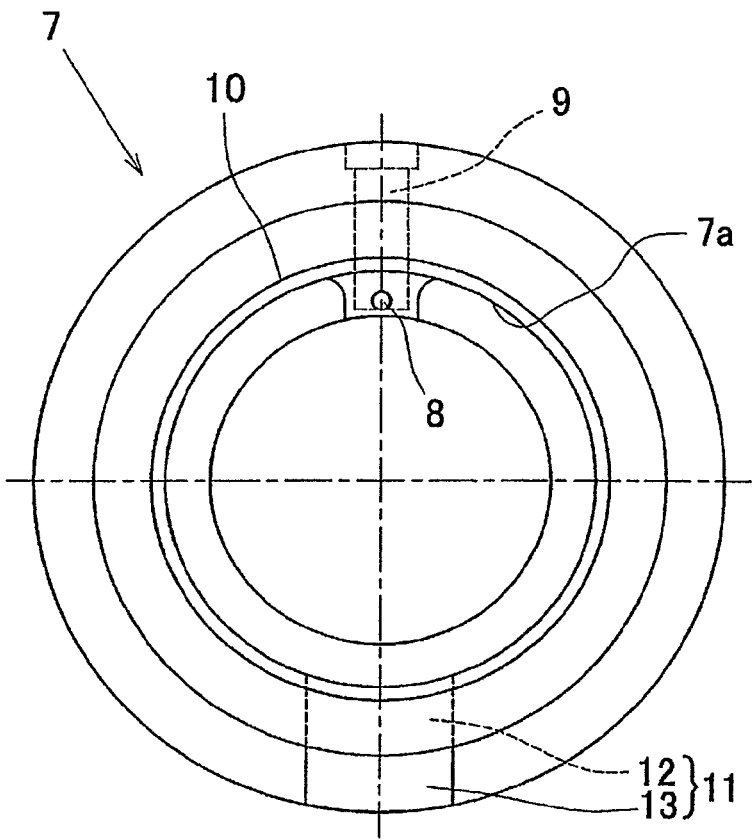
FIG. 2 is a front elevational view of a lubricating oil introduction member employed in the lubricating device as viewed from the side, where the bearing is arranged.

FIG. 2 illustrates a front elevational view of the lubricating oil introduction member 7 from the side of the bearing 1. In this example, although only one oil supply passage 9 and only one discharge opening 8 communicated therewith are shown as employed, a plurality of oil supply passages 9 and a plurality of discharge openings 8 communicated respectively therewith may be circumferentially spacedly arranged in the lubricating oil introduction member 7 to increase the lubricating efficiency.

The bore diameter of the discharge opening 8 shown in FIG. 1A is preferably so chosen as to be small in order to increase the jetting speed of the discharged oil. Also, the length of a straight section of the discharge opening 8 is preferably so chosen as to be about four times the bore diameter of the discharge opening 8 in order to prevent the discharged oil from being spread. The angle of the discharge opening 8 relative to the end face of the inner race 2 where the circumferential groove 6 is formed may be arbitrarily chosen as desired.

The lubricating oil introduction member 7 includes a flange-like section 10 extending axially from a side surface of the lubricating oil introduction member 7 towards the bearing 1 and overlaying the slope section 2b of the inner race 2 with a minute gap δ left between the flange-like section 10 and the slope section 2b as shown in FIG. 18. Accordingly, the amount of the lubricating oil flowing from the minute gap δ towards the raceway surface 2a can be controlled. A corner section, at which the end face of the inner race 2 opposed to the discharge opening 8 intersects with the sloped section 2b, is rendered to be a curved surface section 2ba having an arcuate section so that the lubricating oil can be prevented from being separated away from this corner section 2ba and then away from the inner race 2 by the effect of the centrifugal force. It is to be noted that the lubricating oil introduction member 7 is preferably subjected to a hardening treatment in order to prevent internal damage and also to increase the handling capability.

The lubricating oil discharged from the discharge opening 8 is discharged to the outside through a lubricating oil discharge passage 11 shown in FIG. 1A. This lubricating oil discharge passage 11 includes, for example, an oil discharge passageway 12, a groove-like oil discharge passageway 13, those of which are defined in the lubricating oil introduction member 7, and an oil discharge groove 14 defined in the outer race spacer 15 that is arranged in contact with the other of the end faces of the inner race 2 where large load is imposed. The oil discharge passageway 12 of the lubricating oil introduction member 7 is, as best shown in FIG. 2, formed at a location circumferentially spaced from the discharge opening 8 (specifically at a location spaced 180° from the discharge opening 8 in the circumferential direction in the illustrated embodiment) so as to extend from an inner peripheral surface to an outer peripheral surface of the lubricating oil introduction member 7. It is to be noted that each of the oil discharge passageway 12, the groove-like oil discharge passageway 13 and the oil discharge groove 14 may be employed at a plurality of circumferentially spaced locations.

The inner peripheral surface of the lubricating oil introduction member 7, except for a portion of the inner peripheral surface where the discharge opening 8 is formed, is rendered to be a stepped face 7a having a portion thereof, axially opposed to the inner race 2, which portion is of a diameter greater than that of the remaining portion thereof, and the oil discharge passageway 12 opens at this stepped face 7a. Also, the groove-like oil discharge passageway 13 of the lubricating oil introduction member 7 is formed in a portion of the side surface of the lubricating oil introduction member 7 adjacent the end face of the outer race 3, shown in FIG. 1A, so as to extend radially of the lubricating oil introduction member 7. The oil discharge groove 14 in the outer race spacer 15 is formed in a portion of the end face of the outer race spacer 15 adjacent the outer race 3 so as to extend radially of the outer race spacer 15.

It is to be noted that the cooling oil, which may be employed in the practice of the present invention, is of a kind having an ISO viscosity equal to or lower than VG10, VG2 in order to reduce the power loss and to increase the cooling efficiency. Also, for further reduction of the power loss and increase of the cooling efficiency, the cooling oil is preferably a water soluble hydraulic operating oil having a low viscosity and a high thermal conductivity, and stainless steel having a low coefficient of linear expansion is preferred as material for the lubricating oil introduction member 7.

The operation of the lubricating device of the structure described hereinabove will now be described. The cooling oil supplied under pressure into the oil supply passage 9 in the lubricating oil introduction member 7 is discharged from the discharge opening 8 and is then sprayed into the circumferential groove 6 in the inner race 2, which is opposed to the discharge opening 8. A portion of the cooling oil so sprayed into the circumferential groove 6 flows as a lubricating oil from the radially outer wall surface 6a of the circumferential groove 6 in the inner race 2 towards the raceway surface 2a of the inner race 2 by the effect of a surface tension of the cooling oil and a centrifugal force acting on the cooling oil as a result of rotation of the inner race 2. The flow of the lubricating oil from the radially outer wall surface 6a of the circumferential groove 6 towards the slope section 2b can be smoothly accomplished when the surface tension of the lubricating oil, the centrifugal force acting on the lubricating oil and the angle of inclination of the slope section 2b are so tailored as to balance with each other, preventing the lubricating oil from being spread by the effect of the centrifugal force. In the illustrated instance, since the portion where the end face of the inner race 2 intersects with the sloped section 2b of the inner race 2 is rendered to be the curved surface section 2ba, the flow of the lubricating oil towards the slope section 2b takes place smoothly.

Figure 1B:
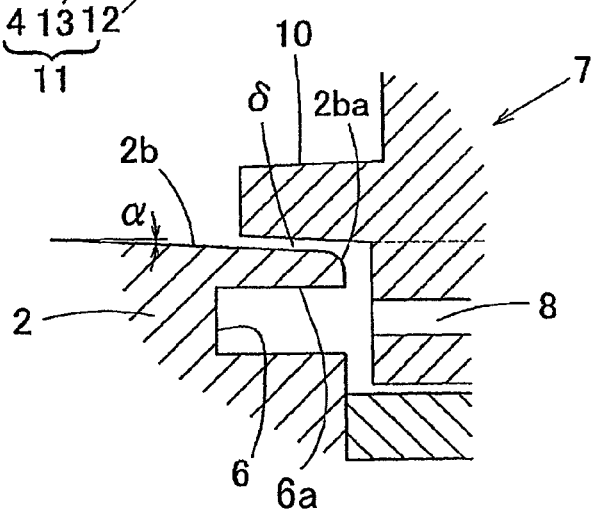
FIG. 1B is an enlarged view of a portion encompassed by the circle A in FIG. 1A.

Also, since the flange-like section 10 of the lubricating oil introduction member 7 overlays the slope section 2b of the inner race 2 with the minute gap δ left between the flange-like section 10 and the slope section 2b as shown in FIG. 1B, the amount of the lubricating oil flowing in the minute gap δ can be controlled easily with no need to externally adjust the amount of the cooling oil flowing towards the oil supply passage 9. A part of the lubricating oil, excluding that flowing into the minute gap δ, is discharged to the outside by an oil discharge pump (not shown) after having flowed through the oil discharge passageway 12, the groove-like oil discharge passageway 13, both of which are defined in the lubricating oil introduction member 7, and the oil discharge groove 14 in the outer race spacer 15, all forming respective parts of the lubricating oil discharge passage 11 shown in FIG. 1A. With the lubricating oil as the cooling oil discharged through those passageways 12, 13 and 14, the rolling bearing 1 can be cooled effectively.

The foregoing lubricating device for the rolling bearing is so designed and so operable that the lubricating oil discharged from the lubricating oil introduction member 7 is supplied into the bearing 1 after having flowed along the surface of the inner race 2 with the flow amount of the lubricating oil being controlled and, accordingly, no high stirring resistance occurs inside the bearing 1 and the bearing 1 can be operated at high speed without the power loss being increased. Unlike the lubricating structure, in which a minute gap is formed at the end face of the inner race 2, the control of the flow amount of the lubricating oil can be accomplished even where the bearing size is small and/or the thickness of the inner race 2 is small, since the flange-like section 10 of the lubricant oil introduction member 7 overlays the slope section 2b on the outer peripheral surface of the inner race 2 with the minute gap δ formed between the flange-like section 10 and the slope section 2b and the flow amount is controlled at this minute gap δ.

Also, since the lubricating oil discharged from the discharge opening 8 is discharged to the outside through the oil discharge passageway 12, the groove-like oil discharge passageway 13, both of which are defined in the lubricating oil introduction member 7, and the oil discharge groove 14 in the outer race spacer 15, all forming respective parts of the lubricating oil discharge passage 11, to thereby effectively cool the rolling bearing 1, any complicated oil supply mechanism is not necessary to cool the bearing 1.

Moreover, since the lubricating oil introduction member 7 is a ring-shaped, outer race spacer provided in contact with the end face of the outer race 3, there is no need to use any special member for the lubricating oil introduction member 7 and the structure of the lubricating oil introduction member 7 can therefore be simplified.

Since the lubricating oil introduction member 7 is so designed as to have the oil discharge passageway 12 positioned at a location spaced circumferentially from the discharge opening 8 and extending from the inner peripheral surface to the outer peripheral surface of the lubricating oil introduction member 7, the length of a flow path through which the lubricating oil, which is not used for the bearing lubrication, flows into the oil discharge passageway 12, can be increased and, therefore, the cooling efficiency can be increased correspondingly.

Since the lubricating oil introduction member 7 has the groove-like oil discharge passageway 13, which is different from the oil discharge passageway 12 and which extends radially in the side surface thereof held in contact with the end face of the outer race 15, and also since the oil discharge groove 14 is provided in the outer race spacer 15, discharge of the lubricating oil supplied into the bearing 1 and used for lubrication of the bearing 1 can take place favorably and the possibility of the dirty lubricating oil being piled up inside the bearing 1 can be avoided.

Figure 3:
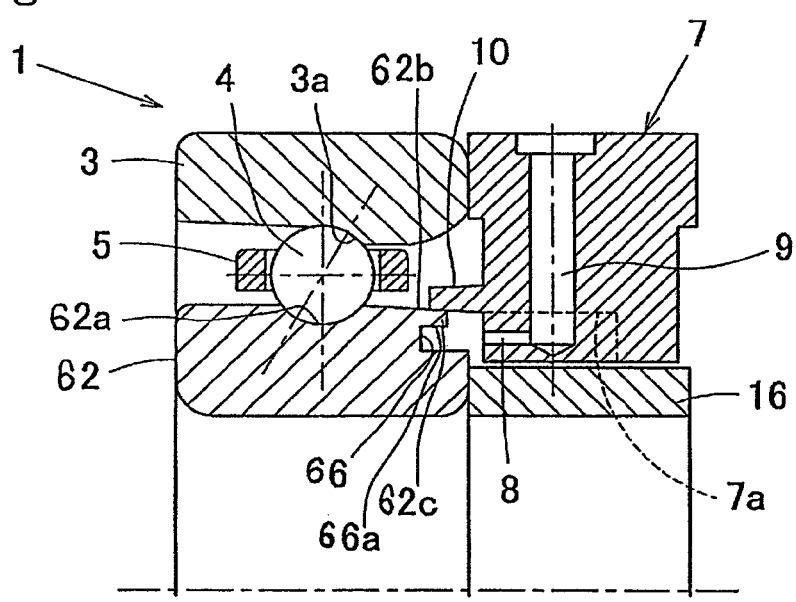
FIG. 3 is a longitudinal sectional view of the lubricating device for the rolling bearing according to a second preferred embodiment of the present invention.

FIG. 3 illustrates a second preferred embodiment of the present invention. The lubricating device for the rolling bearing according to this second embodiment is similar to that according to the first embodiment, except that a flange-like section 62c formed between the circumferential groove 6 and the slope section 62b in the inner race 62 has its free end set back axially from the end face of the inner race 62. Other structural features of the second embodiment are similar to those shown and described in connection with the first embodiment.

In the case of this second embodiment, since the length of projection of the flange-like section 62c in the inner race 62 can be reduced, the flow path through which the lubricating oil flows from the radially outer wall surface 6a of the circumferential groove 66 towards the sloped section 62b can be shortened, allowing the lubricating oil to flow smoothly towards the inner race raceway surface 62b. Also, where the bearing size is small, it is possible to avoid that the wall thickness of the free end of the inner race flange-like section 62c is reduced excessively.

FIGS. 4A and 4B illustrate a third preferred embodiment of the present invention. The lubricating device for the rolling bearing according to this third embodiment is similar to that shown and described in connection with the second embodiment with reference to FIG. 3, except that the radially outer wall surface 76a of the circumferential groove 76 in the inner race 72 is tapered to have a diameter increasing towards the opening of the groove 76. Other structural features of the third embodiment are similar to those shown and described in connection with the second embodiment.

In the case of this third embodiment, since the radially outer wall surface 6a of the circumferential groove 76 is rendered to be a tapered surface, the flow of the lubricating oil from the radially outer wall surface 76a of the circumferential groove 76 towards the slope section 72b by the effect of the centrifugal force can take place smoothly.

FIGS. 5A and 5B illustrate a fourth preferred embodiment of the present invention. The lubricating device for the rolling bearing according to this fourth embodiment is similar to that shown and described in connection with the third embodiment with reference to FIGS. 4A and 4B, except that a radially inner wall surface 86b of the circumferential groove 86 is tapered to have a diameter decreasing towards the opening of the groove 86. Other structural features of the fourth embodiment are similar to those shown and described in connection with the second embodiment.

In the case of the fourth embodiment, since the radially inner wall surface 86b of the circumferential groove 86 is rendered to be a tapered surface, the lubricating oil discharged from the discharge opening 8 and then sprayed into the circumferential groove 86 can be easily collected at a bottom surface of the circumferential groove 86 which extends between the radially outer and inner wall surfaces 86a and 86b and, therefore, the lubricating oil can be correspondingly supplied from the circumferential groove 86 towards the raceway surface 82a assuredly.

Figures 6A, 6B:
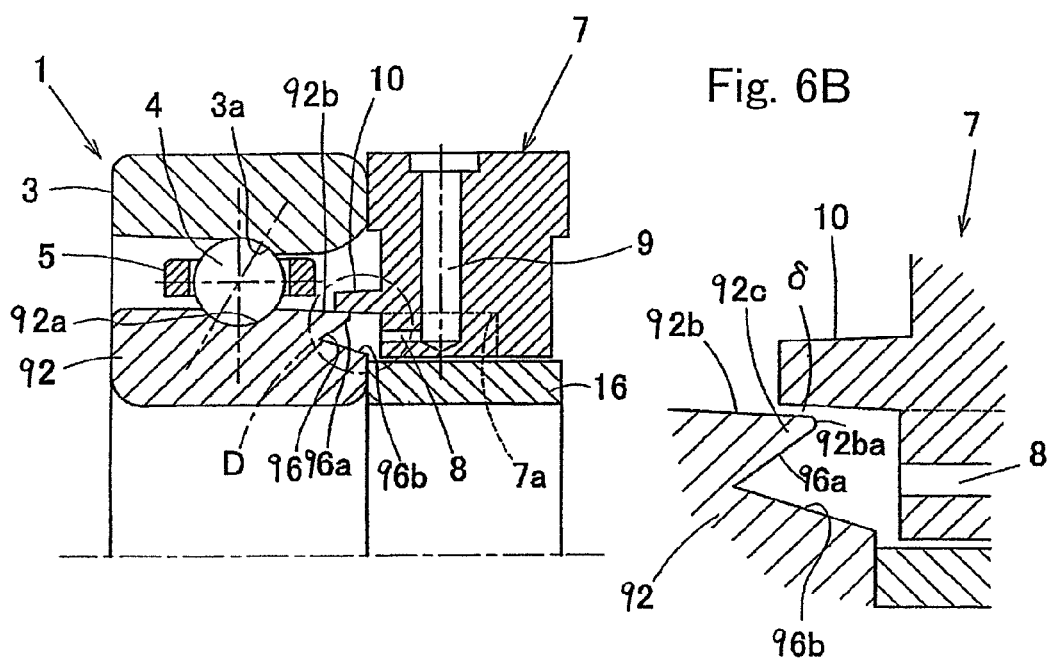
FIG. 6A is a longitudinal sectional view of the lubricating device for the rolling bearing according to a fifth preferred embodiment of the present invention.
FIG. 6B is an enlarged view of a portion encompassed by the circle D in FIG. 6A.
Figure 8:
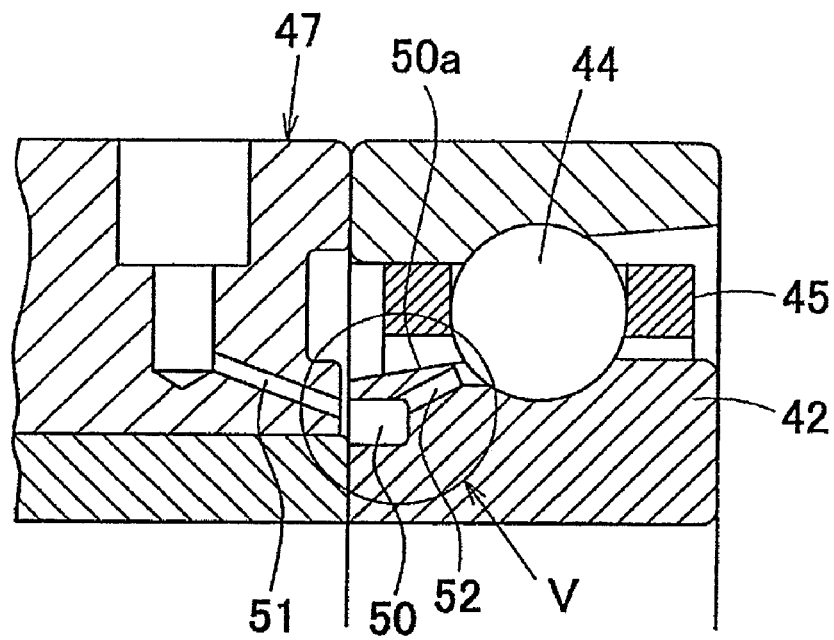
FIG. 8 is a longitudinal sectional view of the prior art counterpart.
Figure 9:
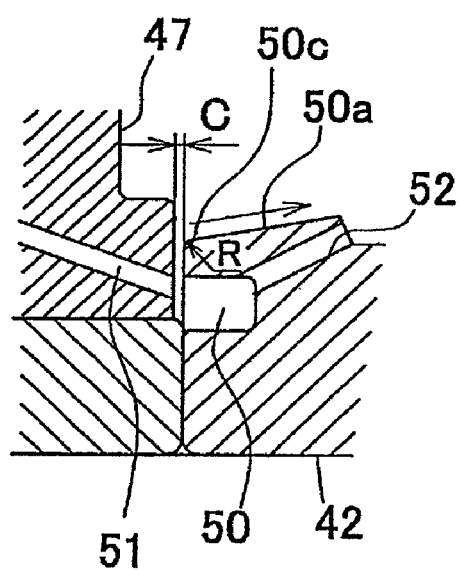
FIG. 9 is an enlarged view of a portion encompassed by the circle V in FIG. 8.
Figure 10:
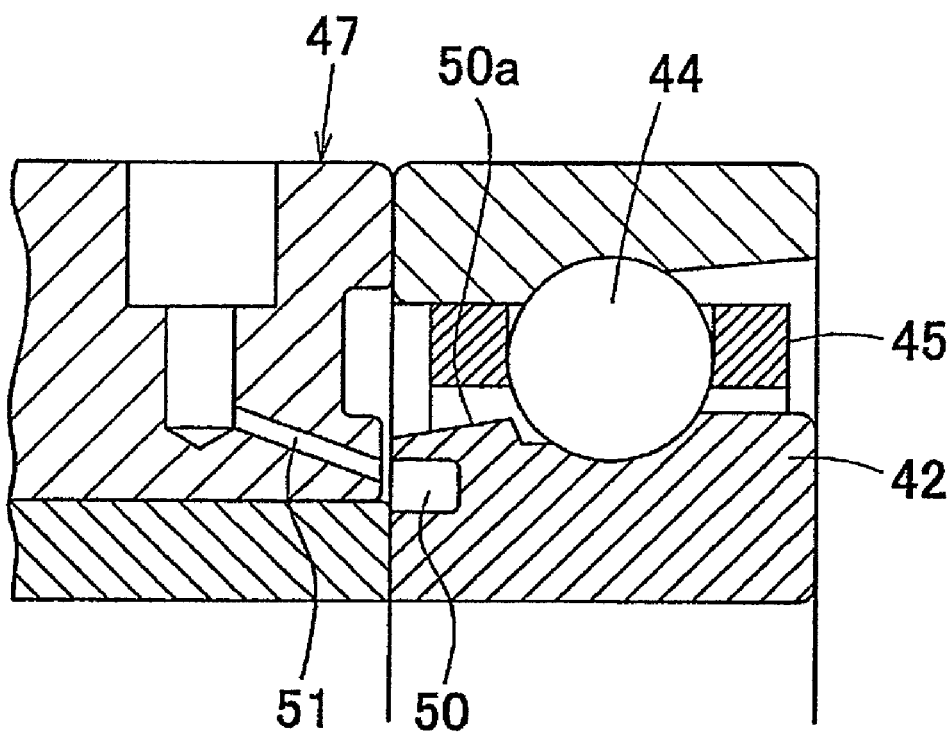
FIG. 10 is a longitudinal sectional view of a modified form of the prior art counterpart.

FIG. 6 illustrates a fifth preferred embodiment of the present invention. The lubricating device for the rolling bearing according to this fifth embodiment is similar to that shown and described in connection with the fourth embodiment with reference to FIGS. 5A and 5B, except that the circumferential groove 96 in the inner race 92 is so shaped as to have a V-shaped section delimited by the radially outer wall surface 96a, which is tapered to have a diameter increasing towards the opening of the groove 96, and an inner wall surface 96b on the inner peripheral side, which is tapered to have a diameter decreasing towards the opening of the groove 96. Other structural features of the fifth embodiment are similar to those shown and described in connection with the fourth embodiment.

In the case of the fifth embodiment, since the circumferential groove 96 is so designed as to have the V-shaped section by the radially outer and inner wall surfaces 96a and 96b, respectively, the circumferential groove 96 can easily be machined.

FIG. 7 illustrates an example of a spindle device 24 equipped with the lubricating device for the rolling bearing according to the first embodiment. This spindle device 24 is of a type used in a machine tool and includes a main spindle 25 having one end to which a chuck for a tool or a work is fitted. The main spindle 25 is supported by a plurality of rolling bearings 1 (two bearings 1 in this example) spaced from each other in an axial direction. The inner race 2 of each of the rolling bearings 1 is mounted on an outer peripheral surface of the main spindle 25 and the outer race 3 of the bearing 1 is engaged with an inner peripheral surface of a housing 26. The inner race 2 and the outer race 3 are fixed within the housing 26 by means of inner race retainers 27 and outer race retainers 28, respectively. The housing 26 is of a double construction including an inner housing 26A and an outer housing 26B.

An outer race spacer 30 and the lubricating oil introduction members 7 are interposed between the respective outer races 3 of the neighboring rolling bearings 1, and an inner race spacer 31 is interposed between the respective inner races 2 of the neighboring rolling bearings 1. A bearing fixing nut 32 for fixing the rolling bearings 1 while being urged against the inner race retainer 27 is threadingly mounted on one end of the main spindle 25. The inner housing 26A is provided with two lubricating oil supply passages 33, communicated with the oil supply passage 9 in each of the lubricating oil introduction members 7, and one discharged oil recovery passage 34. Each of the lubricating oil supply passages 33 extends axially and opens at respective opposite end faces of the inner housing 26A. The discharged oil recovery passage 34 extends axially through the outer race retainers 28. The oil discharge passageway 12 and the groove-like oil discharge passageway 13 in each of the lubricating oil introduction members 7 are communicated with this discharged oil recovery passage 34. Also, although in the first embodiment the oil discharge groove 14 has been shown and described as formed in the outer race spacer 15, the oil discharge groove 14 is, in this example, formed in each of the outer race retainers 28 and is communicated with the discharged oil recovery passage 34.

The lubricating device for the rolling bearing 1 receives a part of the discharged cooling oil supplied from a cooling oil supply device 35 through a filter 36, then through the lubricating oil supply passage 33 and the oil supply passage 9 of the lubricating oil introduction member 7 and supplies a part of the oil as a lubricating oil and the remaining part of the oil as a cooling oil to the inside of the rolling bearing 1 as hereinbefore described. The oil, used as the cooling oil and discharged into the discharged oil recovery passage 34 through the oil discharge passageway 12, the groove-like oil discharge passageway 13 and the oil discharge groove 14, is recovered by a discharged oil pump 37 into an oil recovery tank 38 and is then returned to the cooling oil supply device 35. The housing 26 is provided with a separate oil supply passage (not shown) for the purpose of cooling the housing 26 and the cooling oil is supplied from the cooling oil supply device 35 to this oil supply passage. Also, the cooling oil used to cool the housing 26 is recovered into the oil recovery tank 38 and is then returned to the cooling oil supply device 35.

The invention claimed is:

1. A lubricating device for a rolling bearing comprising:
a lubricating oil introduction member for discharging a lubricating oil into the rolling bearing to lubricate the rolling bearing;
the rolling bearing including an inner race having a raceway surface, an outer race, and rolling elements interposed between the inner race and the outer race, the inner race having an end face formed with a circumferential groove and also having an outer peripheral surface that has a diameter increasing towards the raceway surface of the inner race to define a slope section;
wherein the lubricating oil introduction member has a discharge opening that opens towards the circumferential groove to discharge the lubricating oil into the circumferential groove and the lubricating oil within the circumferential groove is guided on the slope section towards the raceway surface of the inner race by an effect of a surface tension of the lubricating oil and a centrifugal force acting on the lubricating oil;
wherein a flange-like section is formed in the lubricating oil introduction member so as to overlay the slope section with a minute gap left between the flange-like section and the slope section for controlling a flow amount of the lubricating oil flowing towards the raceway surface;
wherein the lubricating oil introduction member is provided with a lubricating oil discharge passage for discharging to the outside, except for a portion of the lubricating oil discharged from the discharge opening and flowing into the minute gap between the slope section of the inner race and the flange-like section, a remaining portion of the lubricating oil discharged from the discharge opening;
wherein the lubricating oil introduction member is a ring-shaped, outer race spacer disposed in contact with an end face of the outer race; and
wherein the lubricating oil introduction member includes:
an oil discharge passageway defined at a location spaced circumferentially from the discharge opening and extending from an inner peripheral surface to an outer peripheral surface of the lubricating oil introduction member, or
a groove-like oil discharge passageway that is defined in a surface thereof held in contact with the end face of the outer race so as to extend radially of the lubricating oil introduction member.

2. The lubricating device for the rolling bearing as claimed in claim 1, wherein a flange-like section, formed in the inner race between the circumferential groove and the slope section, has a free end set axially backwards from the end face of the inner race.

3. The lubricating device for the rolling bearing as claimed in claim 1, wherein the circumferential groove in the inner race has a radially outer wall surface that is tapered to have a diameter increasing towards an opening of the circumferential groove.

4. The lubricating device for the rolling bearing as claimed in claim 1, wherein the circumferential groove in the inner race has a radially inner wall surface that is tapered to have a diameter decreasing towards an opening of the circumferential groove.

5. The lubricating device for the rolling bearing as claimed in claim 1, wherein the circumferential groove in the inner race has a radially outer wall surface that is tapered to have a diameter increasing towards an opening of the circumferential groove, and also has a radially inner wall surface that is tapered to have a diameter decreasing towards the opening of the circumferential groove.

6. The lubricating device for the rolling bearing as claimed in claim 1, wherein a portion of the lubricating oil supplied by the lubricating oil introduction member flows towards the raceway surface through the minute gap and most of the lubricating oil cools the rolling bearing and then is discharged through the oil discharge passageway or the groove-like oil discharge passageway.

7. The lubricating device for the rolling bearing as claimed in claim 1, wherein the rolling bearing further includes a retainer for retaining the rolling elements; and
wherein an axial tip end of the flange-like section is located axially outwardly of an axial end face of the retainer.

8. A lubricating device for a rolling bearing comprising:
a lubricating oil introduction member for discharging a lubricating oil into the rolling bearing to lubricate the rolling bearing;
the rolling bearing including an inner race having a raceway surface, an outer race, rolling elements interposed between the inner race and the outer race, and a retainer for retaining the rolling elements, the inner race having an end face formed with a circumferential groove and also having an outer peripheral surface that has a diameter increasing towards the raceway surface of the inner race to define a slope section;
wherein the lubricating oil introduction member has a discharge opening that opens towards the circumferential groove to discharge the lubricating oil into the circumferential groove and the lubricating oil within the circumferential groove is guided on the slope section towards the raceway surface of the inner race by an effect of a surface tension of the lubricating oil and a centrifugal force acting on the lubricating oil; and wherein a flange-like section is formed in the lubricating oil introduction member so as to overlay the slope section with a minute gap left between the flange-like section and the slope section for controlling a flow amount of the lubricating oil flowing towards the raceway surface, the flange-like section having an axial tip end located axially outwardly of an axial end face of the retainer.

9. The lubricating device for the rolling bearing as claimed in claim 8, wherein the lubricating oil introduction member is provided with a lubricating oil discharge passage for discharging to the outside, except for a portion of the lubricating oil discharged from the discharge opening and flowing into the minute gap between the slope section of the inner race and the flange-like section, a remaining portion of the lubricating oil discharged from the discharge opening.

10. The lubricating device for the rolling bearing as claimed in claim 8, wherein the lubricating oil introduction member is a ring-shaped, outer race spacer disposed in contact with an end face of the outer race.

11. The lubricating device for the rolling bearing as claimed in claim 10, wherein the lubricating oil introduction member includes an oil discharge passageway defined at a location spaced circumferentially from the discharge opening and extending from an inner peripheral surface to an outer peripheral surface of the lubricating oil introduction member.

12. The lubricating device for the rolling bearing as claimed in claim 10, wherein the lubricating oil introduction member includes a groove-like oil discharge passageway that is defined in a surface thereof held in contact with the end face of the outer race so as to extend radially of the lubricating oil introduction member.

13. The lubricating device for the rolling bearing as claimed in claim 8, wherein a flange-like section, formed in the inner race between the circumferential groove and the slope section, has a free end set axially backwards from the end face of the inner race.

14. The lubricating device for the rolling bearing as claimed in claim 8, wherein the circumferential groove in the inner race has a radially outer wall surface that is tapered to have a diameter increasing towards an opening of the circumferential groove.

15. The lubricating device for the rolling bearing as claimed in claim 8, wherein the circumferential groove in the inner race has a radially inner wall surface that is tapered to have a diameter decreasing towards an opening of the circumferential groove.

16. The lubricating device for the rolling bearing as claimed in claim 8, wherein the circumferential groove in the inner race has a radially outer wall surface that is tapered to have a diameter increasing towards an opening of the circumferential groove, and also has a radially inner wall surface that is tapered to have a diameter decreasing towards the opening of the circumferential groove.

* * * * *